(12) United States Patent
Weber

(10) Patent No.: US 11,928,727 B2
(45) Date of Patent: *Mar. 12, 2024

(54) MANAGING PRODUCTS AT A PHYSICAL MARKETPLACE

(71) Applicant: eBay Inc., San Jose, CA (US)

(72) Inventor: Dirk Weber, Potsdam (DE)

(73) Assignee: eBay Inc.v, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/860,071

(22) Filed: Jul. 7, 2022

(65) Prior Publication Data
US 2022/0343410 A1    Oct. 27, 2022

Related U.S. Application Data

(63) Continuation of application No. 16/838,968, filed on Apr. 2, 2020, now Pat. No. 11,416,916, which is a continuation of application No. 14/884,937, filed on Oct. 16, 2015, now Pat. No. 10,643,269.

(51) Int. Cl.
*G06Q 30/00*   (2023.01)
*G06Q 30/0601* (2023.01)

(52) U.S. Cl.
CPC ..... *G06Q 30/0643* (2013.01); *G06Q 30/0623* (2013.01)

(58) Field of Classification Search
CPC .................................................. G06Q 30/06
USPC ...................................................... 705/26, 27
See application file for complete search history.

(56) References Cited

U.S. PATENT DOCUMENTS

| | | | |
|---|---|---|---|
| 6,384,850 B1 | 5/2002 | McNally et al. | |
| 6,871,325 B1 | 3/2005 | McNally et al. | |
| 6,982,733 B1 | 1/2006 | McNally et al. | |
| 7,945,484 B1 | 5/2011 | Tam et al. | |
| 8,121,902 B1 | 2/2012 | Desjardins et al. | |
| 8,160,929 B1 | 4/2012 | Park et al. | |
| 8,321,293 B2 | 11/2012 | Lewis et al. | |
| 9,141,985 B1 | 9/2015 | Wiebe et al. | |
| 10,643,269 B2 * | 5/2020 | Weber | G06Q 30/0623 |
| 11,416,916 B2 * | 8/2022 | Weber | G06Q 30/0623 |
| 2002/0118294 A1 | 8/2002 | Takano et al. | |
| 2005/0097005 A1 | 5/2005 | Fargo | |

(Continued)

OTHER PUBLICATIONS 3 trends driving the tech revolution at retail, Patel, Sheena. Display & Design Ideas : DDI25.3: 90,92,94,96,98. Emerald Expositions LLC. (Apr./May 2013) Dialog #1328025152 3pgs, (Year: 2013).

(Continued)

*Primary Examiner* — Robert M Pond
(74) *Attorney, Agent, or Firm* — FIG. 1 Patents

(57) ABSTRACT

In various example embodiments, a system and method for managing products at a physical marketplace is described. A method includes receiving an image and a category of a product for sale by a merchant at a physical marketplace, including the image in a list of images for the category, providing the list of images to customers of the physical marketplace, retrieving additional information regarding the product in response to a request by one of the customers, and generating a listing for the product using the image, the category, and the additional information received from the merchant.

20 Claims, 16 Drawing Sheets

(56) References Cited

U.S. PATENT DOCUMENTS

| | | |
|---|---|---|
| 2007/0220057 A1 | 9/2007 | Melman et al. |
| 2012/0084177 A1 | 4/2012 | Tanaka et al. |
| 2014/0214559 A1 | 7/2014 | Hu |
| 2014/0279013 A1 | 9/2014 | Chelly et al. |
| 2014/0279283 A1 | 9/2014 | Budaraju et al. |
| 2017/0109811 A1 | 4/2017 | Weber |
| 2020/0234362 A1 | 7/2020 | Weber |

OTHER PUBLICATIONS

Consumers expect seamless cross-channel shopping experience, but they aren't getting it (yet), Research Alert 31.10: 1 (2). EPM Communications, Inc., May 17, 2013, 7 pages.

Final Office Action received for U.S. Appl. No. 14/884,937, dated Dec. 5, 2018, 21 pages.

Final Office Action received for U.S. Appl. No. 14/884,937, dated Oct. 7, 2019, 8 pages.

Final Office Action received for U.S. Appl. No. 16/838,968, dated Feb. 2, 2022, 9 pages.

Non-Final Office Action received for U.S. Appl. No. 14/884,937, dated Mar. 7, 2018, 31 pages.

Non-Final Office Action received for U.S. Appl. No. 14/884,937, dated May 1, 2019, 25 pages.

Non-Final Office Action received for U.S. Appl. No. 16/838,968, dated Aug. 31, 2021, 15 pages.

Notice of Allowance received for U.S. Appl. No. 14/884,937, dated Jan. 7, 2020, 8 pages.

Notice of Allowance received for U.S. Appl. No. 16/838,968, dated Apr. 14, 2022, 10 pages.

U.S. Appl. No. 14/884,937, filed Oct. 16, 2015, Patented, U.S. Pat. No. 10,643,269.

U.S. Appl. No. 16/838,968, filed Apr. 2, 2020, Patented, U.S. Pat. No. 11,416,916.

\* cited by examiner

MANAGING PRODUCTS AT A PHYSICAL MARKETPLACE

CROSS REFERENCE TO RELATED APPLICATIONS

This application is a continuation of U.S. patent application Ser. No. 16/838,968, filed Apr. 2, 2020, entitled "MANAGING PRODUCTS AT A PHYSICAL MARKETPLACE,", which is a continuation application of U.S. patent application Ser. No. 14/884,937, filed Oct. 16, 2015, entitled "MANAGING PRODUCTS AT A PHYSICAL MARKETPLACE," now U.S. Pat. No. 10,643,269, issued May 5, 2020; the disclosures of each of which is hereby incorporated by reference in its entirety.

TECHNICAL FIELD

Embodiments of the present disclosure relate generally to product transactions and, more particularly, but not by way of limitation, to managing products at a physical marketplace.

BACKGROUND

Conventionally, in order for a merchant to sell a product at a network-based marketplace, the merchant must provide sufficient information to allow the network-based marketplace to present the product to customers of the network-based marketplace. Such information frequently includes a category for the product, a price, a description, a condition, shipping options, or the like.

Providing this information is frequently a barrier of entry to merchants. In one example, the merchant may desire selling a very rare item. Because the number of customers that are likely interested in a rare item is likely very limited, the merchant does not believe it is worth the effort to provide the information needed to make a listing at the network-based marketplace.

BRIEF DESCRIPTION OF THE DRAWINGS

Various ones of the appended drawings merely illustrate example embodiments of the present disclosure and cannot be considered as limiting its scope.

Figure 1:
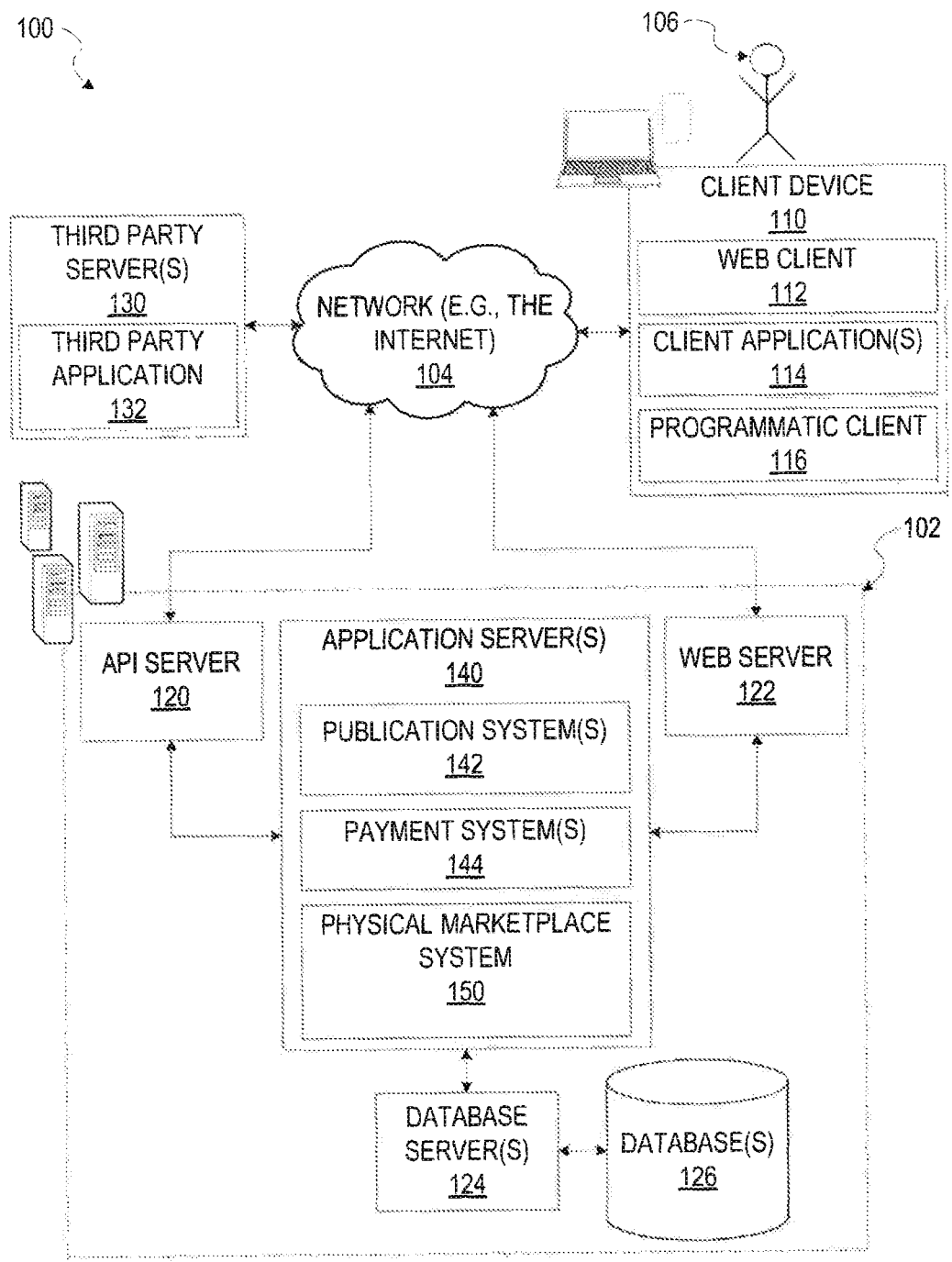
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, a system as described herein provides a simplified interface that overcomes the entry barrier previously described. The system receives a category and an image of a product for sale by a merchant at a physical marketplace. As used herein, a physical marketplace includes, at least, a merchant presenting products for sale at a physical location. Typically, a physical marketplace also has a beginning time and an ending time when customers of the physical marketplace may visit and browse available items. A physical marketplace may also include many merchants, but may also include one. In one example, a physical marketplace is a flea-market as one skilled in the art may appreciate. Thus, many merchants, even hundreds or more, may gather at a physical location to participate in the physical marketplace. In another example, a physical marketplace is single merchant selling products on his/her property. In this example, the physical marketplace is a "garage sale" as one skilled in the art may appreciate.

After receiving the category and image from the merchant, the system may then include the image of the product in a list of images transmitted to a potential customer. In response to receiving an inquiry regarding the product, the system requests additional information from the merchant. After receiving the additional information, the system generates a listing for the product at a network-based marketplace using the image, the category, and the additional information. The system there, more efficiently facilitates entry of a listing for the item at the network-based marketplace based, at least in part, on sales and/or marketing activities made by the merchant at the physical marketplace.

Although the merchant may not be motivated to provide sufficient information to complete a listing for the product at a network-based marketplace, the system generates a listing at the network-based marketplace by inviting the merchant to provide additional information in response to an interested buyer at the physical marketplace. In response to answering questions from potential buyers, the system generates a listing for the product at the network-based marketplace. In certain example embodiments, the merchant answers inquiries from prospective buyers, and the system uses the responses as additional information to complete a listing for the product at the network-based marketplace.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Washington State), an application 114, and a programmatic client 116 executing on client device 110.

The client devices 110 may comprise, but are not limited to, mobile phones, desktop computers, laptops, personal digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screen, accelerometer, gyroscope, camera, microphone, global positioning system (GPS) device, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client devices 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110, and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The physical marketplace system 150, according to one example embodiment, provides functionality operable to generate a listing of a product at a network-based marketplace based on interactions between merchants and potential customers at a physical marketplace.

In one example embodiment, the listing includes the category and the image. For example, in response to not receiving any inquiries from potential customers regarding the item, the additional information may include a title for the listing. Therefore, the listing at the network-based marketplace may not be a Buy-It-Now listing, or a traditional auction listing, but may be any kind of listing to present the information regarding the available product as one skilled in the art may appreciate.

In some example embodiments, the physical marketplace system 150 receives a category and image of a product from the client device 110. The physical marketplace system 150 includes the image in a list of images for products in the provided category to users of the networked system 102. The physical marketplace system 150 may also store the additional information received from a potential customer via the database server 124. Furthermore, the physical marketplace system 150 may provide a listing for the product via the web server 122.

In other embodiments, the physical marketplace system 150 communicates with the publication systems 142 (e.g., accessing item listings) and payment system 144. In an alternative embodiment, the physical marketplace system 150 may be a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and physical marketplace system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, California) to enable sellers to author and manage listings on the networked system 102 in an off-line manner, and to perform batch-mode communications between the programmatic client 116 and the networked system 102.

Additionally, a third party application(s) 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
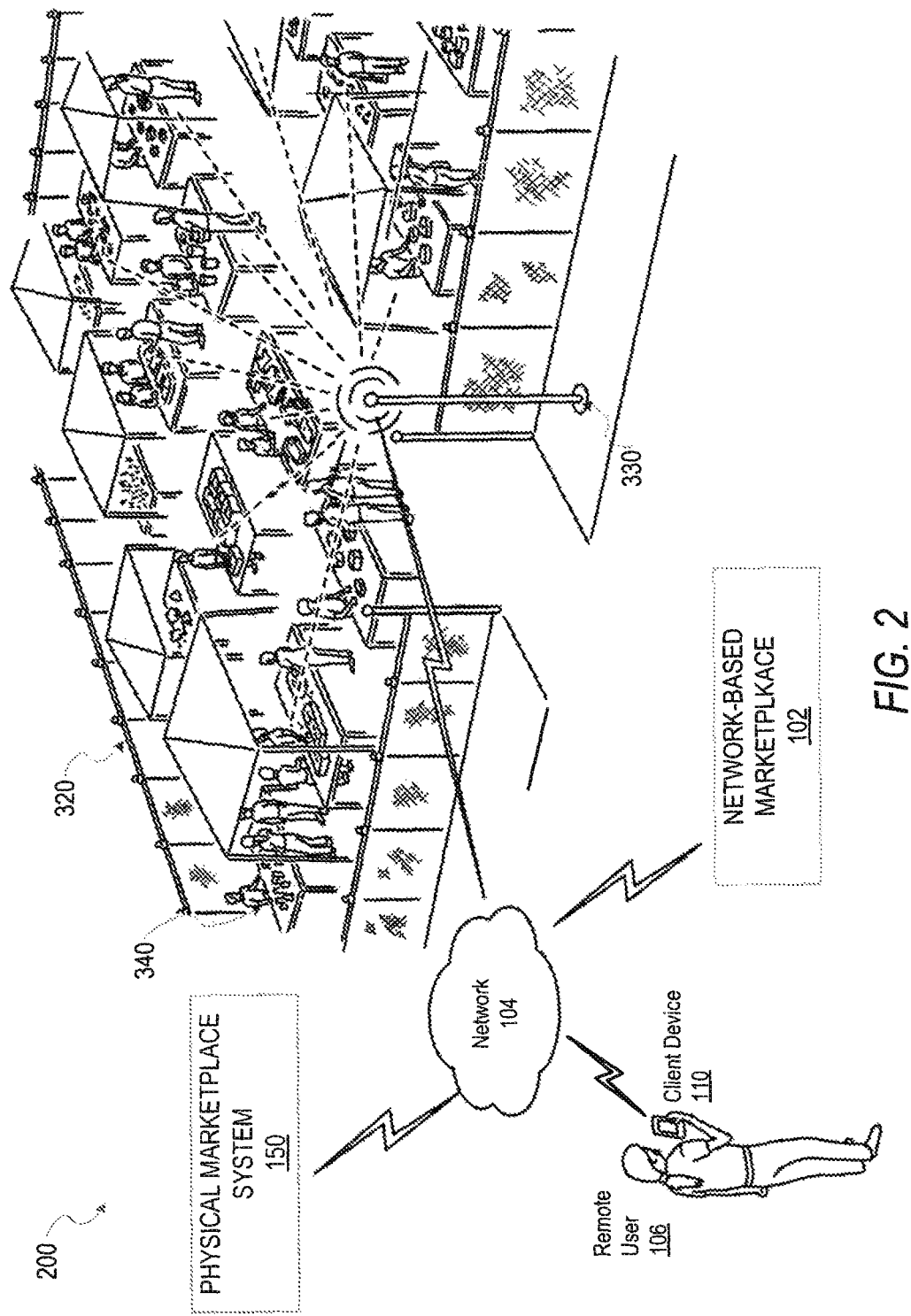
FIG. 2 is an illustration depicting one scenario, according to one example embodiment.

FIG. 2 is an illustration depicting one scenario 200, according to one example embodiment. In this scenario, a physical marketplace 320 is depicted as a flea market of merchants, as one skilled in the art may appreciate. Various merchants at a physical marketplace 320 typically attend the physical marketplace 320 in order to sell their products. Merchants may desire to sell products that are especially unique or rare, or high value, but may not find many interested customers due to the rare or unique properties of the product.

The physical marketplace system 150 receives images and categories of these products from a merchant 340 at the physical marketplace 320. The physical marketplace system 150 then includes the received images in a list of images of products that are available at the physical marketplace 320. Accordingly, a merchant 340 may take a picture of a unique item, select a category, upload the image and then wait for an inquiry from an interested customer. The merchant 340 need not provide any further information regarding the product if there are no interested customers.

The physical marketplace system 150 can immediately include the image in a list of images for products available at the physical marketplace 320. In one example embodiment, a remote user 106 requests a list of images for a category, and the physical marketplace system 150 transmits the list of images to the remote user 106.

In one example embodiment, the remote user 106 selects or otherwise indicates a specific image and requests additional information regarding the product in the image. In response, the physical marketplace system 150 retrieves additional information regarding the product. For example, the physical marketplace system 150 may forward the request to the merchant 340 and receive the additional information from the merchant 340.

After receiving the additional information from the merchant 340, the physical marketplace system 150 generates a listing for the product using the image, the category, and the additional information received from the merchant. Furthermore, as many remote users request additional information from the merchant, the physical marketplace system 150 includes all of the received additional information from the merchant 340 and includes it in the listing for the product. In another example embodiment, the listing is generated for a network-based marketplace as will be further described.

In another example embodiment, the merchant 340 communicates with the physical marketplace system 150 via the network 104. In a further example, a local router 330 facilitates communication between the merchant 340 and the network 104. In one example, the router 330 operates as a cellular tower communicating with various mobile computing devices for the various merchants 340 at the physical marketplace 320. In another example, the router 330 operates as a router for an Ethernet network. Of course, one skilled in the art may recognize many other ways in which a router 330 facilitates communication between computing devices for the merchants 340 and this disclosure is not limited in this regard.

Figure 3:
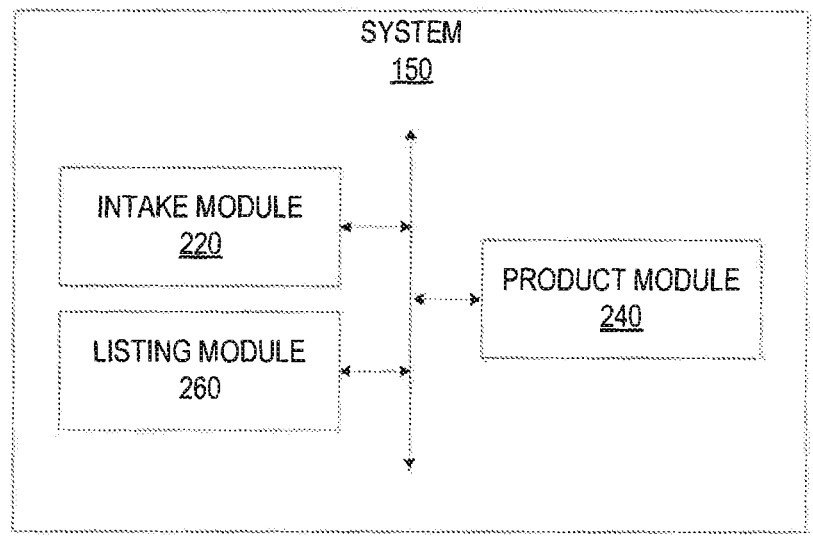
FIG. 3 is a block diagram illustrating one system, according to some example embodiments.

FIG. 3 is a block diagram illustration one physical marketplace system 150, according to some example embodiments. In one embodiment, the physical marketplace system 150 includes an intake module 220, a product module 240, and a listing module 260.

In one embodiment, the intake module 220 is configured to receive an image of a product and a category of the product for sale by a merchant at a physical marketplace. In one example, the intake module 220 receives an image from a mobile computing device associated with the merchant. In one example, the merchant takes a picture using a camera in the mobile computing device and transmits the image to the intake module 220.

In another example, the image may be a stock image generated by a manufacturer of the product. In this example, the merchant provides a link to the stock image on a manufacturer's web site or other generally available resource. Of course, one skilled in the art may recognize a wide variety of different ways in which a merchant may provide and/or indicate an image and this disclosure is not limited in this regard.

In another example embodiment, the intake module 220 determines information about the product in the image based on an analysis of the image, as one skilled in the art may appreciate. In one example, the image includes a bar code, Universal Product Code (UPC) symbol, or the like, and the intake module 220 determines information about the product based on the bar code, symbol, or other identifying mark. In one example, the intake module 220 determines a brand and model number for the product in the image.

In another example embodiment, the physical marketplace system 150 limits the number of categories available to a merchant. Presenting too many categories may make it more difficult for a merchant to select an appropriate category and may discourage merchants from submitting images to the physical marketplace system 150.

In one example, the list of available categories is limited to eight different categories. In one specific example, the list of categories includes, but is not limited to, Clothing, Printed Materials, Appliances, Home Décor, Electronics, Outdoor Equipment, Toys, and Other. As one skilled in the art may appreciate, a complete listing of different categories may include tens of thousands of categories; however, providing a reduced set of categories decreases the amount of work a merchant does to submit an image and a category to the intake module 220. In another embodiment, the set of categories includes a short list of categories wherein each entry in the short list includes one or more subcategories. In other embodiments, the categories include antiques, collectibles, high end fashion, vintage clothing, and children's items. In one example, high end fashion includes designer clothing priced in the top 1% of similar clothing types. In other examples, high end fashion includes clothing articles from a specific designer, distribution channel, or similar. In another example, high end fashion includes clothing on display at a fashion show, or the like.

In another example embodiment, the intake module 220 further requests that the merchant 340 indicate a specific physical marketplace. For example, the database server may store a list of physical marketplaces and their respective locations, start times, end times, number of merchants, or the like. In response to the merchant 340 further indicating a specific physical marketplace, the intake module 220 determines additional information based on the associated information for the physical marketplace. For example, if the merchant 340 indicates a physical marketplace in Hamburg, Germany, then the intake module 220 may retrieve a start time and an end time for the physical marketplace. Furthermore, the intake module 220 may indicate availability times for the product based on the beginning and ending times for the indicated physical marketplace. The specific beginning and ending times for the indicated physical marketplace may also indicate times when the physical marketplace is accessible by the general public.

In another example embodiment, the product module 240 is configured to include the image in a list of images for the category. For example, in response to a remote user 106 requesting available products in a specific category, the product module 240 transmits the list of images to the remote user 106 that requested the list of images. The list of images represents products that are available at the physical marketplace 320 in the category selected by the remote user 106.

Accordingly, the remote user 106, based on a single request, may receive a list of images for products that are available in a category. Such functionality results in decreased effort by merchants to generate listing for their products and increased access by remote users to products available at a physical marketplace 320.

In another embodiment, due to the temporal restrictions associated with a physical marketplace 320 (e.g., the marketplace 320 having a specific start time and a specific end time), a merchant 340 of products at the physical marketplace 320 is typically waiting for information requests from potential customers (e.g., the merchants 340 are actively promoting their products, seeking for potential buyers, etc.). Therefore, the physical marketplace system 150 further provides real-time access to merchants at the physical marketplace by remote users.

In another example embodiment, the product module 240 further transmits a location for a selected product. In one example, the client device 110 for the user is configured to include geo-location information as metadata with the image. In this example, the merchant does not perform any specific steps to indicate a location. The intake module 220 receives the image and the product module 240 determines the location of the product from the geo-location information. Therefore, in response to a request from the user 106, the product module 240 also transmits the location of the product. This allows the client device 110 to display the location via a display so that the user 106 can physically locate the product at the physical marketplace 320.

In another example embodiment, the listing module 260 is configured to request additional information regarding the product from the merchant in response to a request by one of the customers. In one example, the listing module 260 receives a request for additional information from the remote user 106 and forwards the request to the merchant 340. The listing module 260 then receives an answer to the request from the merchant 340 and includes the answer as additional information in a listing for the product.

In another example, the listing module 260 provides a list of potential requests to the remote user 106, and the remote user 106 selects one of the requests. Furthermore, the listing module 260 may receive a selection from the merchant as the additional information. For example, the remote user 106 may request additional information regarding the product by selecting the image associated with the product. The listing module 260 may present the remote user 106 with a set of potential requests, such as, but not limited to, brand, model, part number, condition, use state, functional state, price, shipping information, other, or the like.

In one embodiment, the listing module 260 receives an answer from the user 106 that includes additional information regarding the product. In one example, the additional information includes text information and/or a typed response from the merchant 340. Of course, this is not necessarily the case as the additional information from the merchant 340 may also include a selection from the merchant 340, and/or other additional information in any other form as one skilled in the art may appreciate.

In another example embodiment, the request includes a request to purchase the product. Similarly, the additional information may include a rejection and/or an acceptance of the offer to purchase. In this example, the additional information indicates the merchant's 340 willingness to sell the product at a given price. For example, in response to the merchant 340 rejecting an offer to purchase the product at a given price, the additional information indicates that the seller is not willing to sell the item below the price of the rejected offer. Furthermore, a rejection may include a counter offer from the merchant 340 to the remote user 106. Of course, one skilled in the art may appreciate other communications between the remote user 106 and the merchant 340 and this disclosure is not limited in this regard.

In another example embodiment, the listing module 260 may request payment of a fee by the merchant 340 before disclosing an offer to purchase the product. In this example, the listing module 260 notifies the merchant 340 than an offer has been received to purchase the product. The notification may also include a request to pay a fee before disclosing the offer to the merchant 340. For example, in response to receiving an offer to purchase the product, the listing module 260 may request a $1 fee before disclosing the offer to the merchant 340. Of course, any other value may be used and this disclosure is not limited in this regard.

In another example embodiment, the listing module 260 discloses the offer to purchase the product, but requests that the merchant 340 agree to pay a percentage of the offer price in fees before the transaction between the remote user 106 and the merchant 340 is agreed to. For example, the listing module 260 displays the offer to purchase the product, and requires the merchant 340 to agree to pay 2% of the offer price before acceptance of the offer may be transmitted to the remote user 106.

In another example embodiment, the listing module 260 generates a listing for the product at a network-based marketplace in response to the physical marketplace ending (e.g., an ending time for the physical marketplace 320 passing). In one example embodiment, the listing module 260 requests additional information from the merchant 340 needed to complete the listing. For example, where requests for additional information regarding a product answered four of five fields for a listing at the network-based marketplace 320, the listing module 260 requests the fifth field. In this example embodiment, the listing module 260 indicates to the merchant 340 that only this last field is needed to complete the listing at the network-based marketplace. For example, the listing module 260 may indicate to the merchant 340 that "You are nearly done," or "This is the last question."

In another example embodiment, the merchant 340 may have many similar products for sale. For example, the merchant 340 may have 10 products for sale at the physical marketplace 320. In response to a portion of the products selling at the physical marketplace 320, and the physical marketplace 320 closing, the listing module 260 indicates that five of the products are available for sale at the network-based marketplace.

Figure 4:
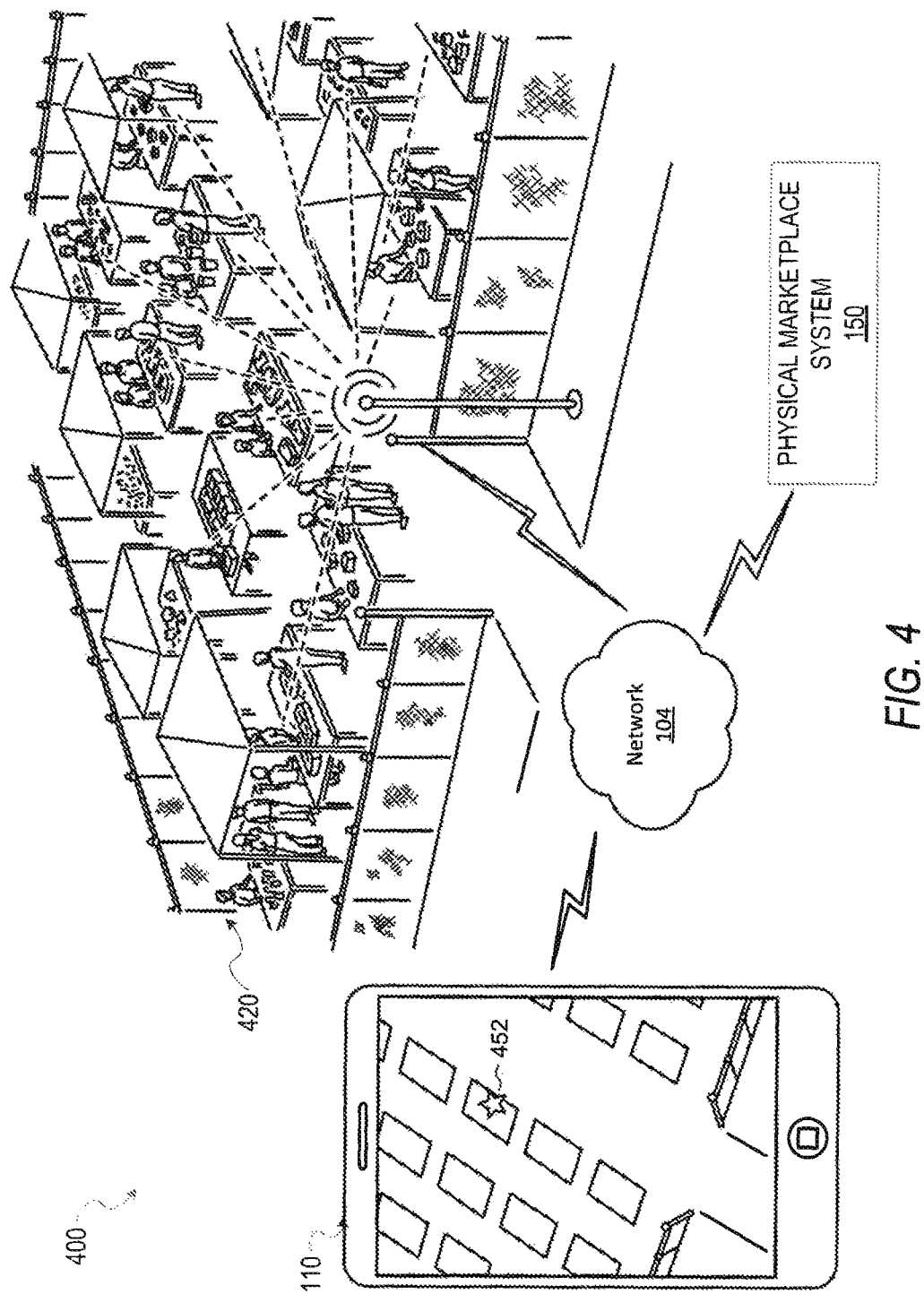
FIG. 4 is an illustration depicting another scenario, according to one example embodiment.

FIG. 4 is an illustration depicting another scenario 400, according to one example embodiment. In this example embodiment, the product module 240 transmits a location for a product to the client device 110. The client device 110 may then display the location in a wide variety of different ways.

In one example embodiment, the product module 240 further transmits a shape file to the client device. A shape file, as described herein, includes an array of vectors that define a geographical region. In this example, the geographical region includes the boundaries of the physical marketplace 420. Thus, in response to the remote user 106 indicating a specific product image, the product module 240 transmits a shape file for the physical marketplace 420 and the location 452 of the image to the client device 110. This allows the client device 110 to present a pictorial representation of the physical marketplace 420 and indicate the specific location 452 of the product at the physical marketplace 420. The remote user 106 may then easily determine where the product is physically located in the physical marketplace 420. In another scenario, the client device 110 further displays the location of the client device so that the user can see where the product is located relative to the client device 110.

In another example embodiment, the product module 240, as previously described, determines the location of the image based on metadata included in the product image. The product module 240 may further transmit one or more maps that depict the area that includes the physical marketplace 320. In this example, the product module 240 retrieves one or more maps from a remote map service. In one example embodiment, the product module 240 transmits a location of the merchant 420 allowing the client device 110 to present the location 452 to the remote user 106.

Figure 5:
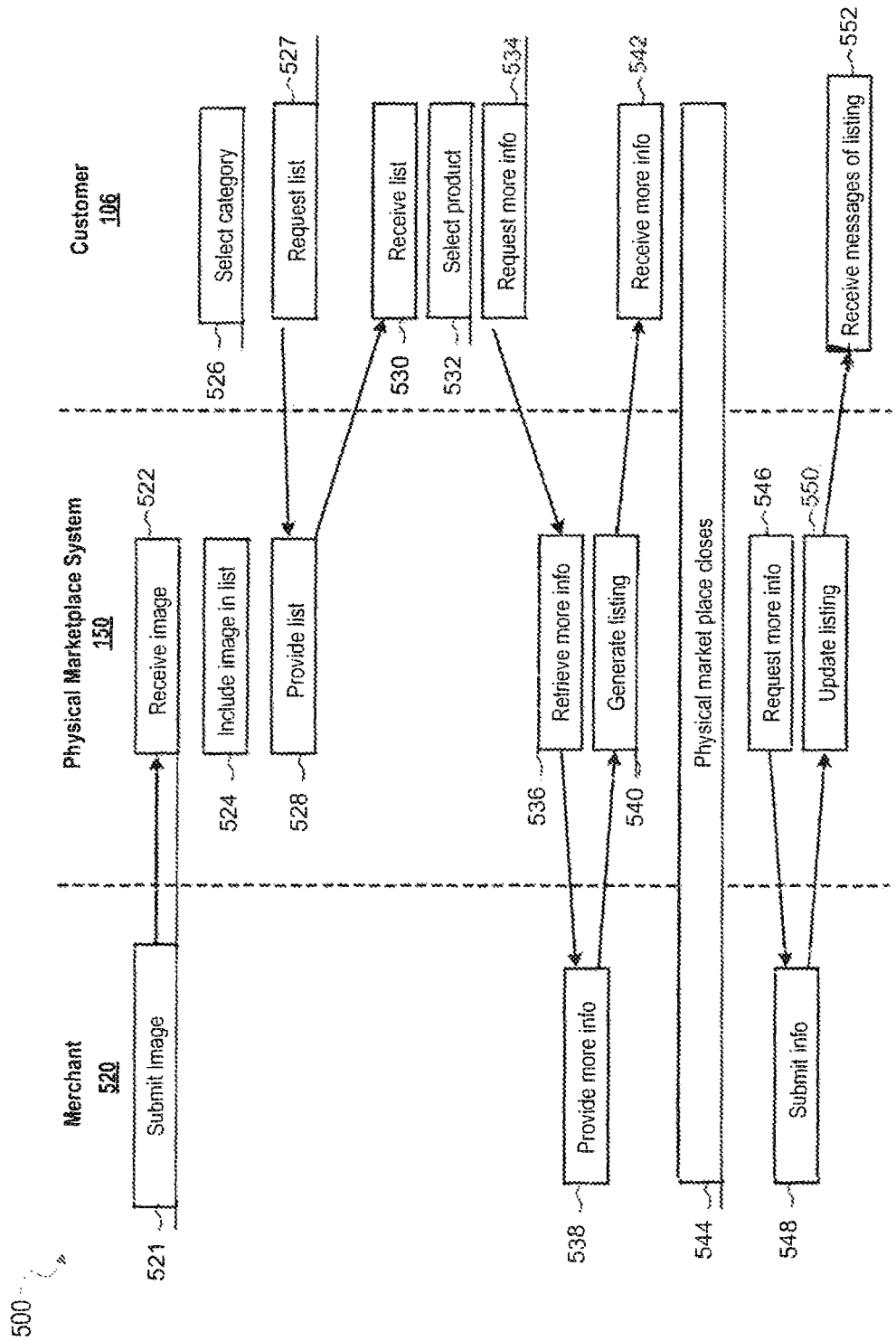
FIG. 5 is a data flow diagram illustrating data flow between a merchant, a system, and a customer, according to one example embodiment.

FIG. 5 is a data flow diagram illustrating data flow 500 between a merchant 520, a physical marketplace system 150, and a user 106, according to one example embodiment. The physical marketplace system 150 may or may not be substantially similar to a physical marketplace system 150 depicted in other figures.

In one embodiment, the merchant 520 submits 521 an image to the physical marketplace system 150. The physical marketplace system 150 receives 522 the image. The physical marketplace system 150 then includes 524 the received image in a list of images for products available at the physical marketplace 320.

The user 106 selects 526 a category of images and requests 527 the list of images from the physical marketplace system 150. In response, the physical marketplace system 150 provides 528 the list to the user 106. The user 106 receives 530 the list of images and may browse through the images seeking an interesting product. The user 106 selects 532 a product by selecting the image of the product and requests 534 additional information about the product.

In response, the physical marketplace system 150 retrieves 536 the requested additional information by requesting the additional information from the merchant 520. The merchant 520 provides 538 the additional information. The physical marketplace system 150 then includes 540 the additional information in a listing for the product and forwards the additional information to the user 106 that requested the additional information. The user 106 receives 542 the additional information.

In response to the physical marketplace 320 closing 544, the physical marketplace system 150 requests 546 information needed to complete a listing at a network-based marketplace as previously described. The merchant 520 submits 548 the requested information, and the physical marketplace system 150 updates 550 the listing. Also, the physical marketplace system 150 notifies 552 the user 106 that the product is now available for purchase at the network-based marketplace.

Figure 6:
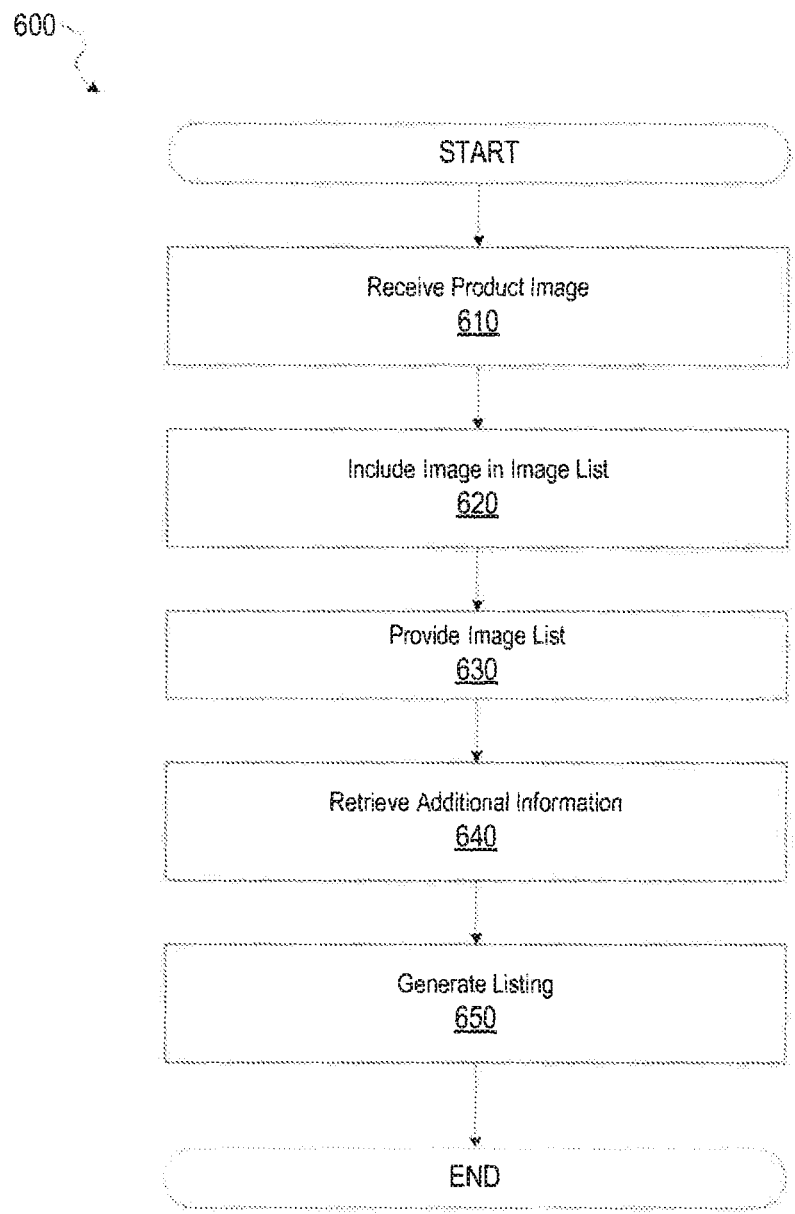
FIG. 6 is a flow diagram illustrating one method for managing products at a physical marketplace, according to one example embodiment.

FIG. 6 is a flow diagram illustrating one method for managing products at physical marketplace according to one example embodiment. Operations in the method 600 may be performed by the physical marketplace system 150, using modules described above with respect to FIG. 3. As shown in FIG. 6, the method 600 includes operations 610, 620, 630, 640, and 650.

The method 600 begins and at operation 610, the intake module 220 receives an image of a product and a category of the product for sale by a merchant at a physical marketplace. In one example embodiment, the product is available for purchase during a time when the marketplace is accessible by the public.

The method 600 continues at operation 620 and the product module 240 includes the image in a list of images for the category. In one example, the list of images represents products available at the physical marketplace. The method 600 continues at operation 630 and the product module 240 provides the list of images to a customer of the physical marketplace. The method 600 continues at operation 640 and the listing module 260 retrieves additional information regarding the product in response to a request from a remote user 106.

In one embodiment, the listing module 260 retrieves additional information regarding the product by transmitting a message to the merchant requesting the information and receiving a response from the merchant that includes the requested additional information. In another embodiment, the listing module 260 retrieves additional information regarding the product by reading the requested information from an already existing listing for the product. For example, where a first customer requested a condition for the product, the listing module 260 retrieved the condition from the merchant. In response to a second customer requesting the condition of the product, the listing module 260 retrieves the condition by reading the condition previously received from the merchant in response to the first customer. In another example, the additional information was determined by the intake module 220 based on a mark included in the image of the product and is included in the listing for the product.

In one embodiment, the remote user 106 identifies the product by selecting the image of the product in the list of images. The method 600 continues at operation 650 and the listing module 260 generates a listing for the product to be used at a network-based marketplace using the image, the category, and the additional information received from the merchant. In another example embodiment, the listing module 260 submits the listing to the network-based marketplace in response to the physical marketplace closing.

Figure 7:
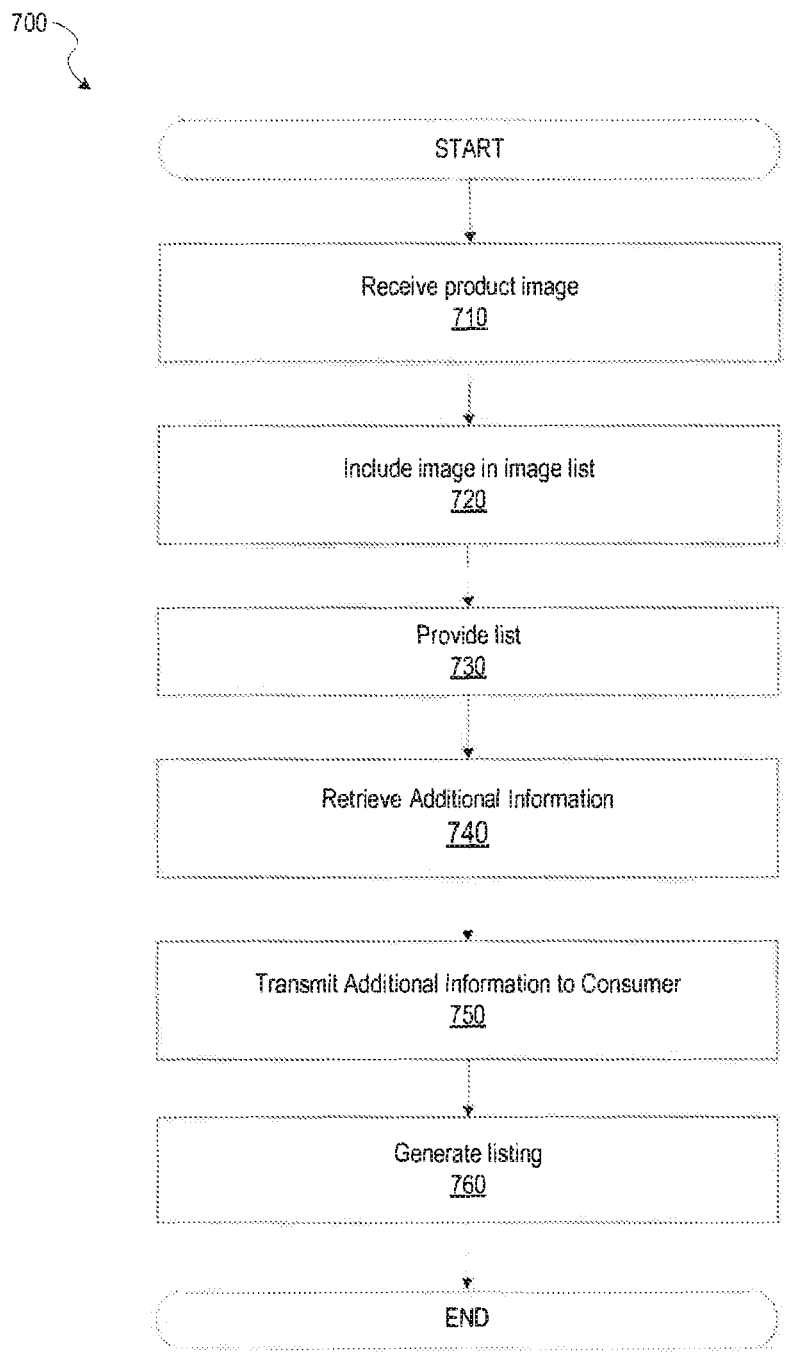
FIG. 7 is a flow diagram illustrating one example embodiment of a method for managing products at a physical marketplace.

FIG. 7 is a flow diagram illustrating one example embodiment of a method 700 for managing products at a physical marketplace. Operations in the method 700 may be performed by the physical marketplace system 150, using modules described above with respect to FIG. 3. As shown in FIG. 7, the method 700 includes operations 710, 720, 730, 740, 750, and 760.

The method 700 begins and at operation 710, the intake module 220 receives an image of a product and a category of the product for sale by a merchant at a physical marketplace. The method 700 continues at operation 720 and the product module 240 includes the image in a list of images for the category. The method 700 continues at operation 730 and the product module 240 provides the list of images to a customer of the physical marketplace. The method 700 continues at operation 740 and the listing module 260 retrieves additional information regarding the product in response to a request from a remote user 106.

The method continues at operation 750 and the product module 240 further transmits the additional information to the customer that requested the additional information. The method 700 continues at operation 760 and the listing module 260 generates a listing for the product using the image, the category, and the additional information received from the merchant.

Figure 8:
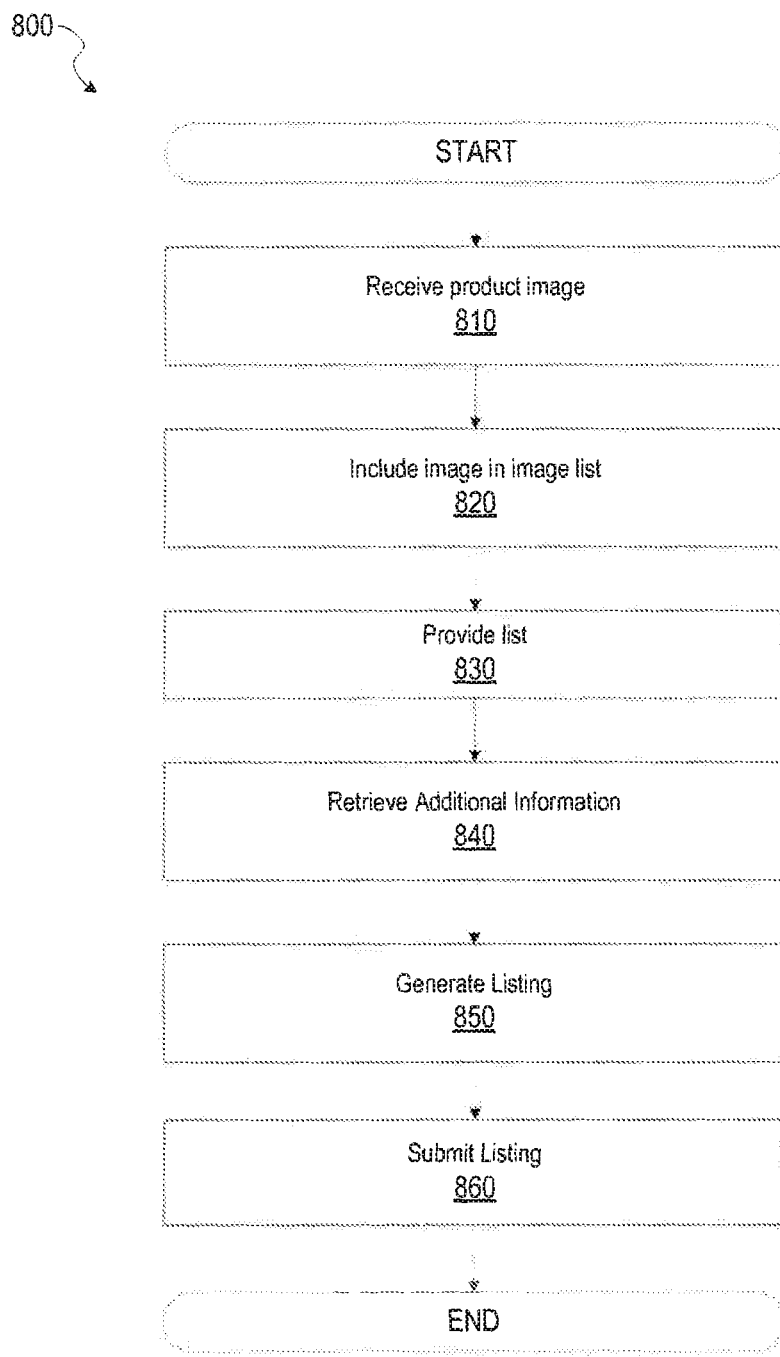
FIG. 8 is a flow diagram illustrating one method for managing products at a physical marketplace, according to one example embodiment.

FIG. 8 is a flow diagram illustrating one method for managing products at a physical marketplace according to one example embodiment. Operations in the method 800 may be performed by the physical marketplace system 150, using modules described above with respect to FIG. 3. As shown in FIG. 8, the method 800 includes operations 810, 820, 830, 840, 850, and 860.

The method 800 begins and at operation 810, the intake module 220 receives an image of a product and a category of the product for sale by a merchant at a physical marketplace. The method 800 continues at operation 820 and the product module 240 includes the image in a list of images for the category, where the list represents products that are available for purchase at the physical marketplace. The method 800 continues at operation 830 and the product module 240 provides the list of images to a customer of the physical marketplace. The method 800 continues at operation 840 and the listing module 260 retrieves additional information regarding the product in response to a request from a remote user 106.

The method 800 continues at operation 850 and the listing module 260 generates a listing for the product using the image, the category, and the additional information received from the merchant. The method 800 continues at operation 860 and the listing module 260, in response to the physical marketplace closing, submits the listing to the networked marketplace.

Figure 9:
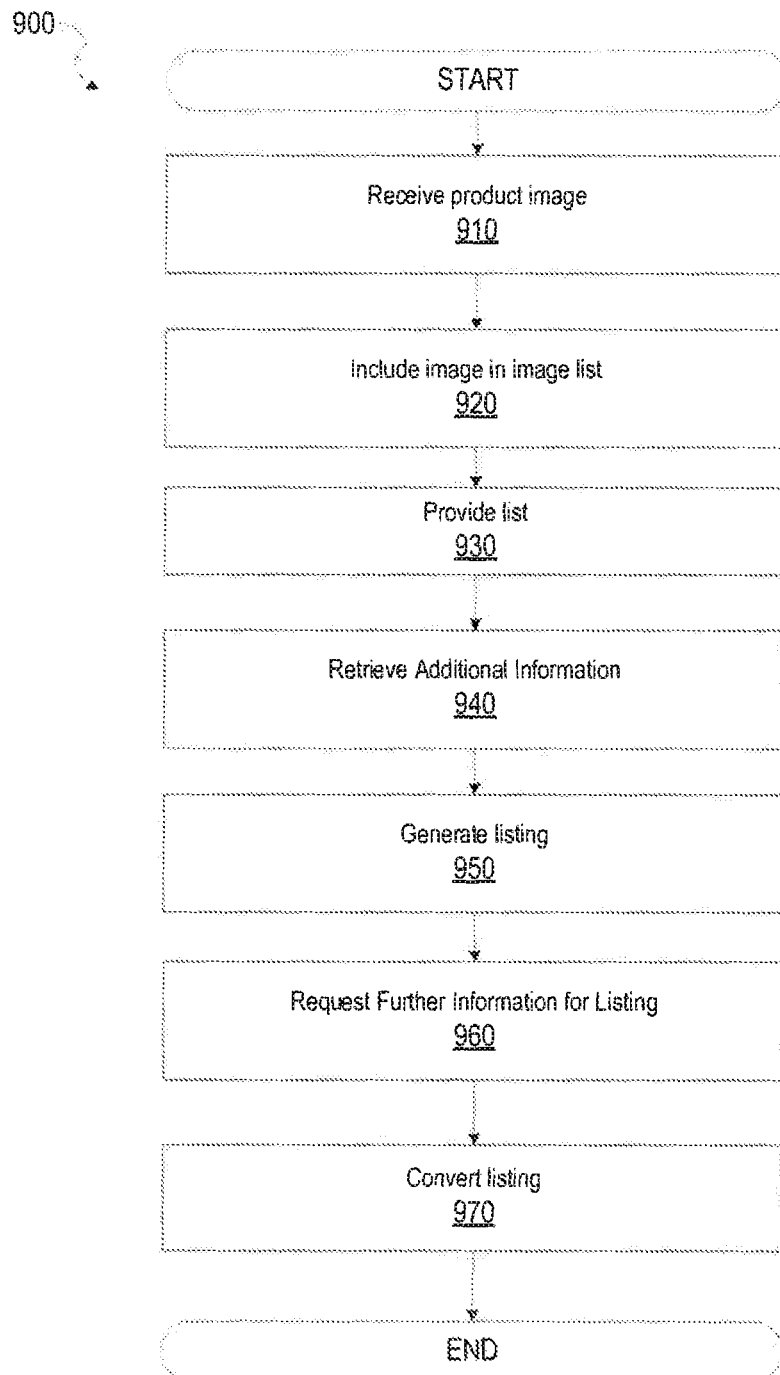
FIG. 9 is a flow diagram illustrating one method for completing a listing for a product at a network-based marketplace, according to one example embodiment.

FIG. 9 is a flow diagram illustrating one method 900 for completing a listing for a product at a network-based marketplace according to one example embodiment. Operations in the method 900 may be performed by the physical marketplace system 150, using modules described above with respect to FIG. 3. As shown in FIG. 9, the method 900 includes operations 910, 920, 930, 940, 950, 960, and 970.

The method 900 begins and at operation 910, the intake module 220 receives an image of a product and a category of the product for sale by a merchant at a physical marketplace. The method 900 continues at operation 920 and the product module 240 includes the image in a list of images for the category, where the list represents products that are available for purchase at the physical marketplace. The method 900 continues at operation 930 and the product module 240 provides the list of images to a customer of the physical marketplace. The method 900 continues at operation 940 and the listing module 260 retrieves additional information regarding the product in response to a request from a remote user 106.

After retrieving the additional information, the method 900 continues at operation 950 and the listing module 260 generates a listing for the product using the image, the category, and the additional information. The listing may be included in a certain section of the network-based marketplace that includes listings for items at a physical marketplace.

In response to the physical marketplace 320 closing, the method continues at operation 960 and the listing module 260 requests further information from the merchant to enhance the listing at the networked marketplace. In one example, in response to a listing at the network-based marketplace needing a starting price, the listing module 260 retrieves a starting price from the merchant. In response to receiving the further information from the merchant, the method 900 continues at operation 970 with the listing module 260 converting the listing to a listing at a networked marketplace for general products.

In one example, the listing module 260 generates a listing for the product at the network-based marketplace for products that are available at the physical marketplace. In response to receiving additional information from the merchant, the listing module 260 enhances the listing at the network-based marketplace. In response to the physical marketplace closing, the listing module 260 converts the listing for the item at a physical marketplace to a listing for general products available at the network-based marketplace.

Figure 10:
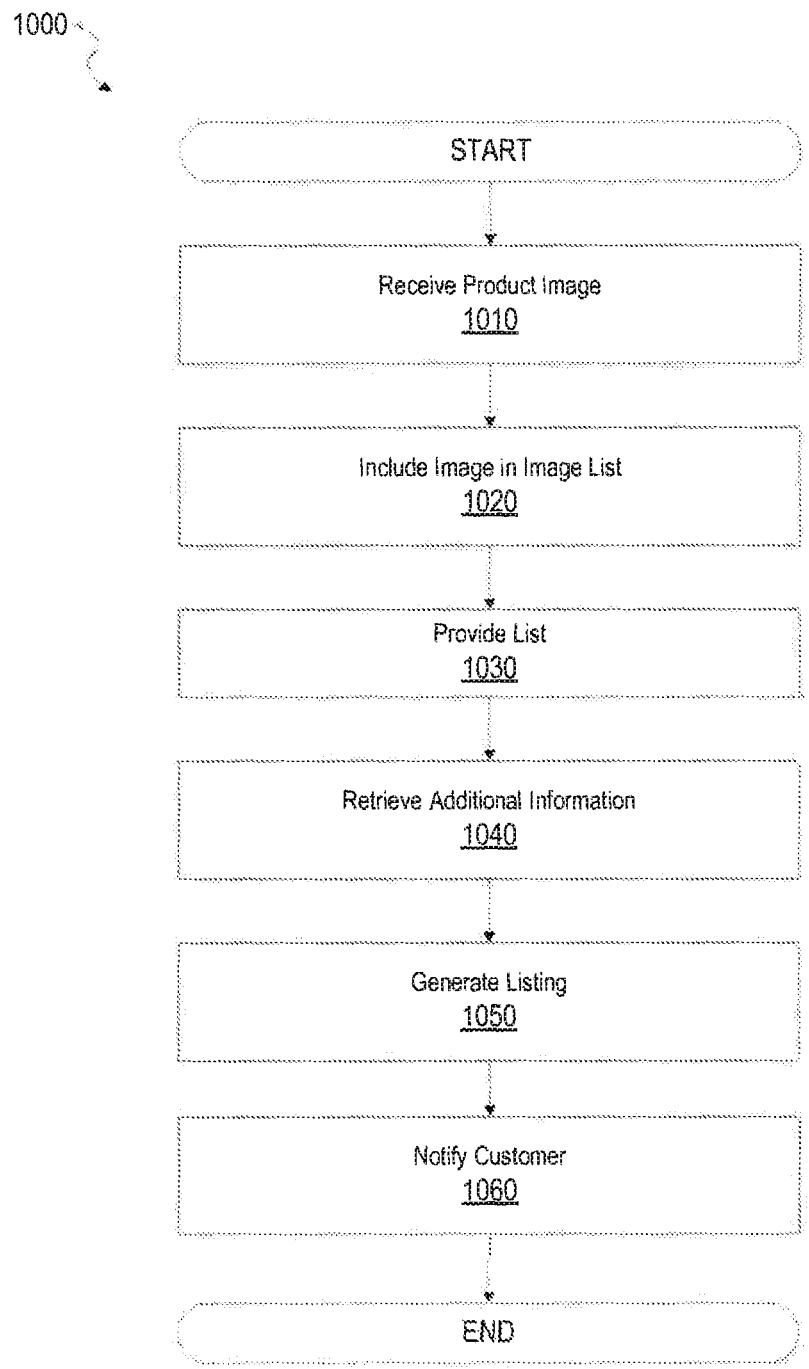
FIG. 10 is a flow diagram illustrating one method for managing products at a physical marketplace, according to one example embodiment.

FIG. 10 is a flow diagram illustrating one method 1000 for managing products at a physical marketplace according to one example embodiment. Operations in the method 1000 may be performed by the physical marketplace system 150, using modules described above with respect to FIG. 3. As shown in FIG. 10, the method 1000 includes operations 1010, 1020, 1030, 1040, 1050, and 1060.

The method 1000 begins and at operation 1010, the intake module 220 receives an image of a product and a category of the product for sale by a merchant at a physical marketplace. The method 1000 continues at operation 1020 and the product module 240 includes the image in a list of images for the category, where the list represents products that are available for purchase at the physical marketplace. The method 1000 continues at operation 1030 and the product module 240 provides the list of images to a customer of the physical marketplace. The method 1000 continues at operation 1040 and the listing module 260 retrieves additional information regarding the product in response to a request from a remote user 106.

After retrieving the additional information, the method 1000 continues at operation 1050 and the listing module 260 generates a listing for a networked-marketplace of the product using the image, the category, and the additional information. The method 1000 continues at operation 1060 with the listing module 260 notifying the customer that the product is available at the networked marketplace.

Figure 11:
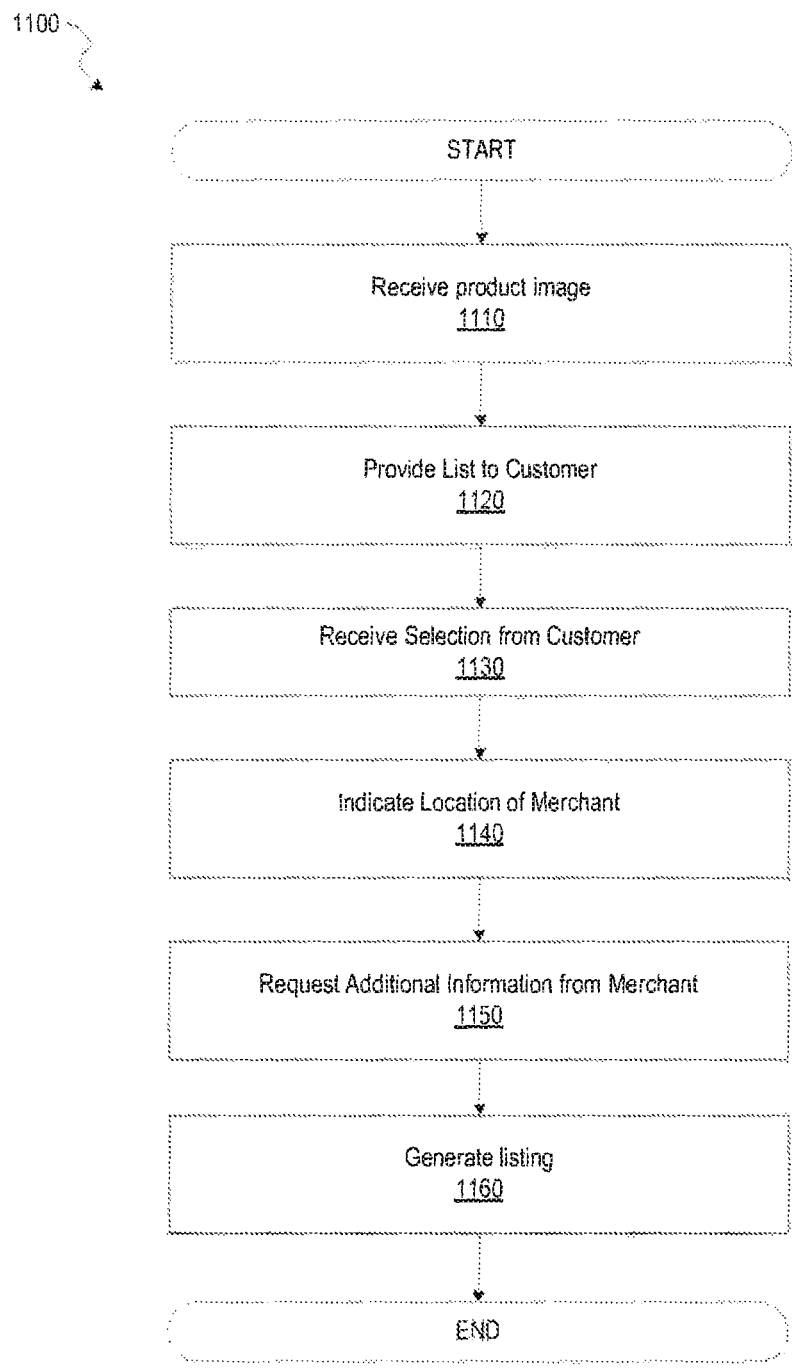
FIG. 11 is a flow diagram illustrating one method for completing a listing for a product at a network-based marketplace, according to one example embodiment.

FIG. 11 is a flow diagram illustrating one method for completing a listing for a product at a network-based marketplace according to one example embodiment. Operations in the method 1100 may be performed by the physical marketplace system 150, using modules described above with respect to FIG. 3. As shown in FIG. 11, the method 1100 includes operations 1110, 1120, 1130, 1140, 1150, and 1160.

The method 1100 begins and at operation 1110, the intake module 220 receives an image of a product and a category of the product for sale by a merchant at a physical marketplace. The method 1100 continues at operation 1120 and the product module 240 includes the image in a list of images for the category. The method 1100 continues at operation 1130 and the product module 240 receives a selection from the customer, the selection indicating one of the images in the list of images.

The method 1100 continues at operation 1140 and the product module 240 transmits a physical location of the product at the physical marketplace in response to the customer selecting the image of the product from the list of images. The method 1100 continues at operation 1150 and the listing module 260 requests further information from the merchant to complete the listing at the network-based marketplace. The method 1100 continues at operation 1160 and the listing module 260 generates a listing for the product using the image, the category, and the additional information received from the merchant.

Figure 12:
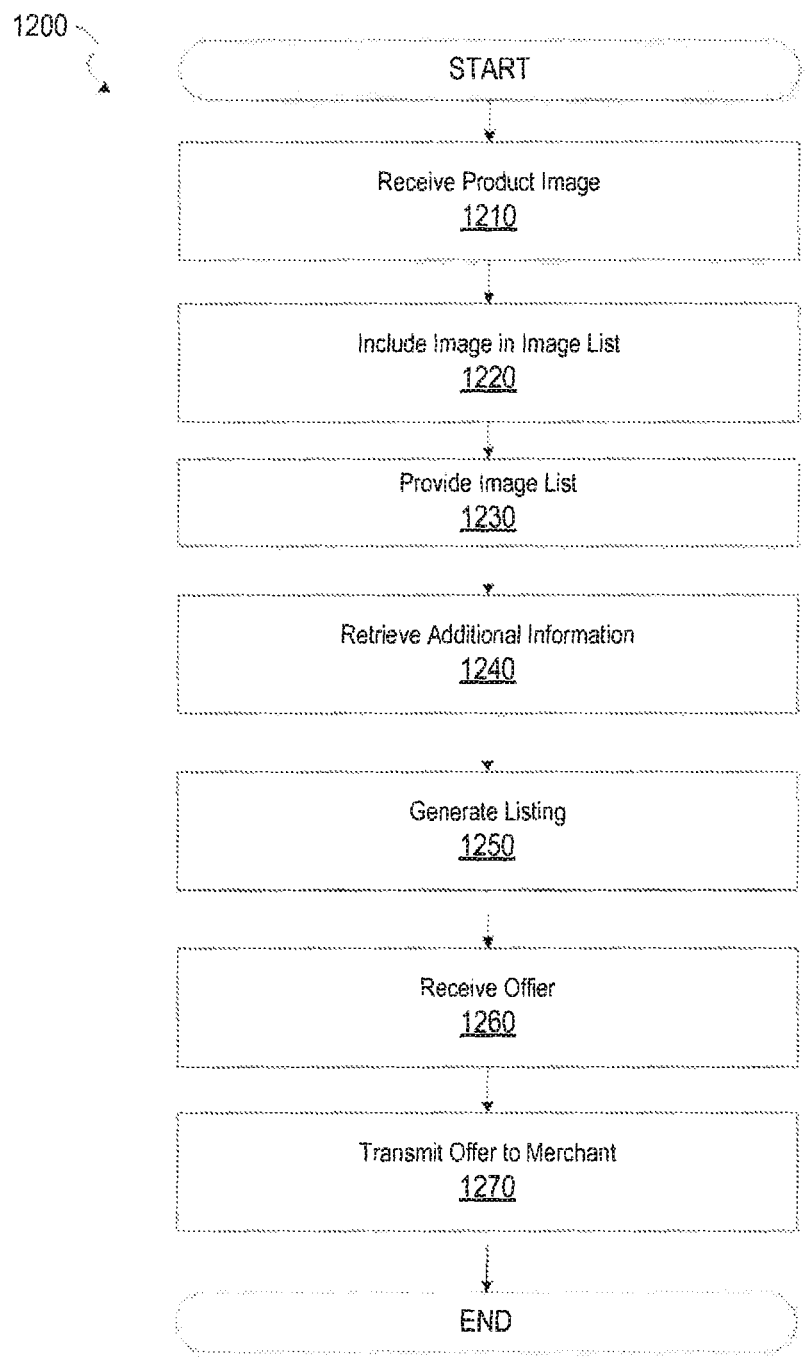
FIG. 12 is a flow diagram illustrating one method for managing products at a physical marketplace, according to one example embodiment.

FIG. 12 is a flow diagram illustrating one method 1200 for managing products at a physical marketplace according to one example embodiment. Operations in the method 1200 may be performed by the physical marketplace system 150, using modules described above with respect to FIG. 3. As shown in FIG. 12, the method 1200 includes operations 1210, 1220, 1230, 1240, 1250, 1260, and 1270.

The method 1200 begins and at operation 1210, the intake module 220 receives an image of a product and a category of the product for sale by a merchant at a physical marketplace. The method 1200 continues at operation 1220 and the product module includes the image in a list of images for the category. The method 1200 continues at operation 1230 and the product module 240 provides the list of images to a customer of the physical marketplace. The method 1200 continues at operation 1240 and the listing module 260 retrieves additional information regarding the product in response to a request from a remote user 106.

The method 1200 continues at operation 1250 and the listing module 260 generates a listing for the product using the image, the category, and the additional information retrieved by the listing module 260. The method 1200 continues at operation 1260 and the listing module 260 receives an offer from the consumer to purchase the product. The method 1200 continues at operation 1270 and the listing module 260 transmits the offer to the merchant.

Figure 13:
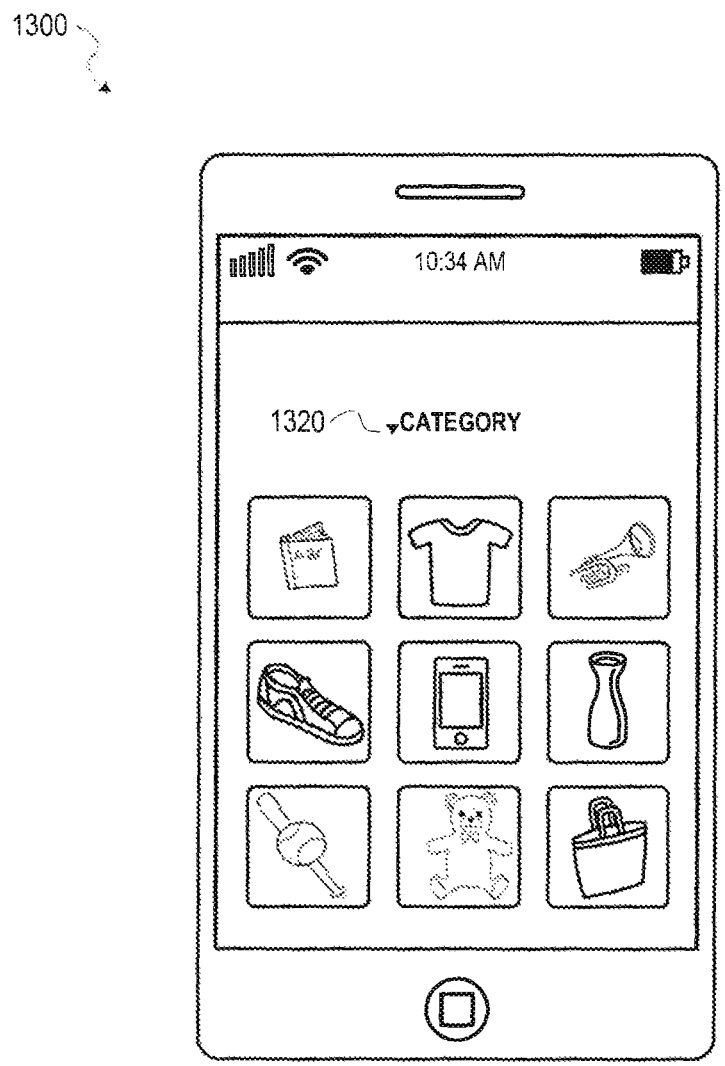
FIG. 13 is an illustration depicting a user interface, according to one example embodiment.

FIG. 13 is an illustration depicting a user interface 1300, according to one example embodiment. The user interface 1300, according to certain embodiments, may be displayed to a merchant 340 and/or a remote user of a client device 110.

In one example, in response to a merchant 340 requesting to add an image to the physical marketplace system 150, the intake module 220 displays the user interface 1300 to a merchant so that the merchant can select a category for image of the item.

In another example, product module 240 displays the user interface 1300 to a remote user of a client device 110. According to this example embodiment, intake module 220 receives a request from the user 106 to browse items available at the physical marketplace. In response, the intake module 220 displays the user interface 1300 to the user requesting the user to select a category of items. In response to receiving a selection indicating a category of items (e.g., via the user interface 1300), the product module 240 displays a list of images in the selected category representing products available at the physical marketplace.

According to one example embodiment, the user interface 1300 presents nine categories: printed materials, apparel, musical instruments, shoes, electronics, home décor, sporting goods, toys, and accessories. Of course, the user interface 1200 may present many other categories, as one skilled in the art may appreciate, and this disclosure is not limited in this regard.

Figure 14:
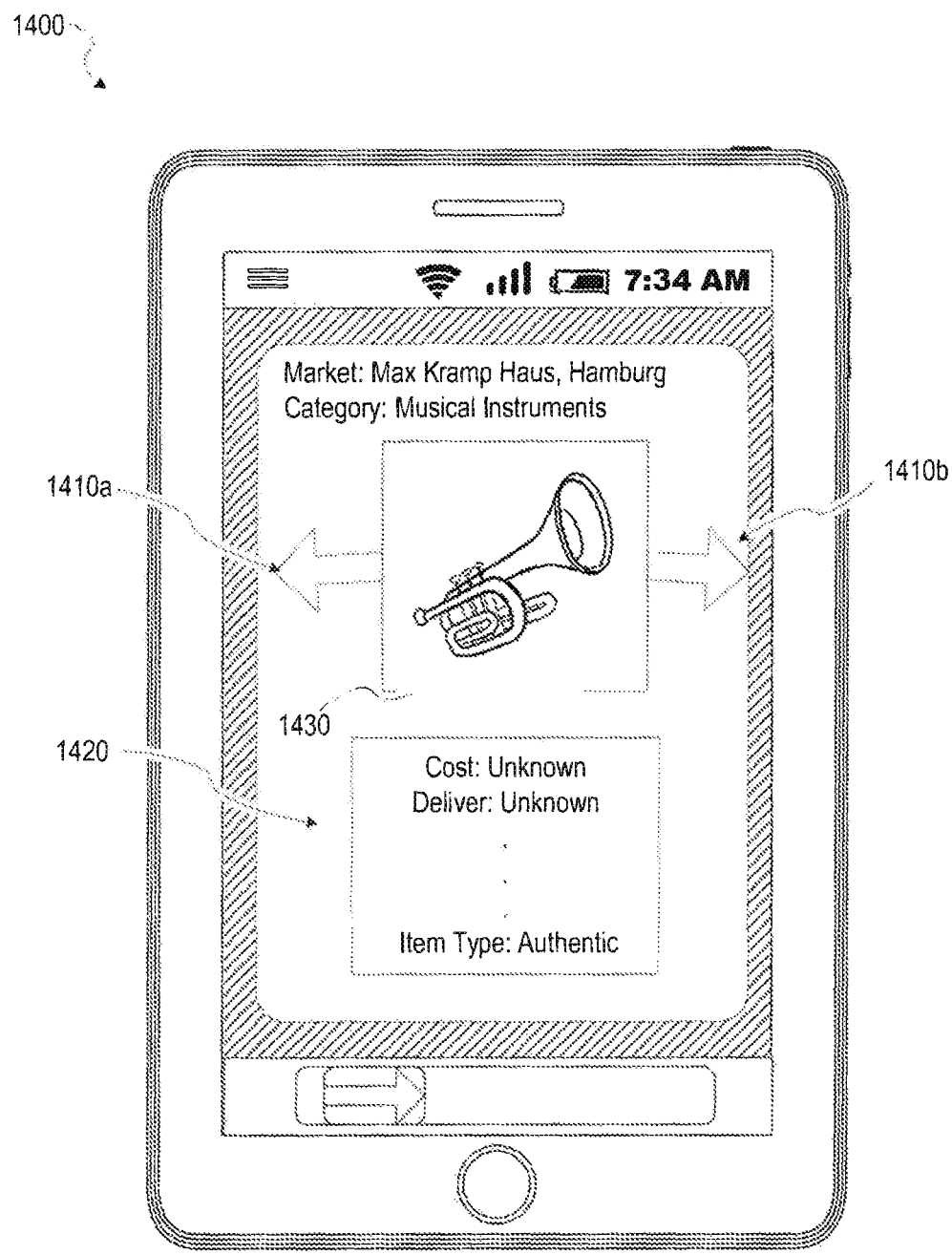
FIG. 14 is an illustration of a user interface, according to one example embodiment.

FIG. 14 is an illustration of a user interface, according to one example embodiment. The user interface 1400, according to this example embodiment, operates at the client device 110. According to this embodiment, the user interface 1400 includes an image 1430 submitted by a merchant 340, a field 1420 for displaying additional information provided by a merchant 340, and user interface controls 110 for scrolling through a list of images as one skilled in the art may appreciate. Accordingly, a potential user 106 quickly scrolls through images of products available at the physical marketplace 320 in the selected category.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 3, 6-12 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 15:
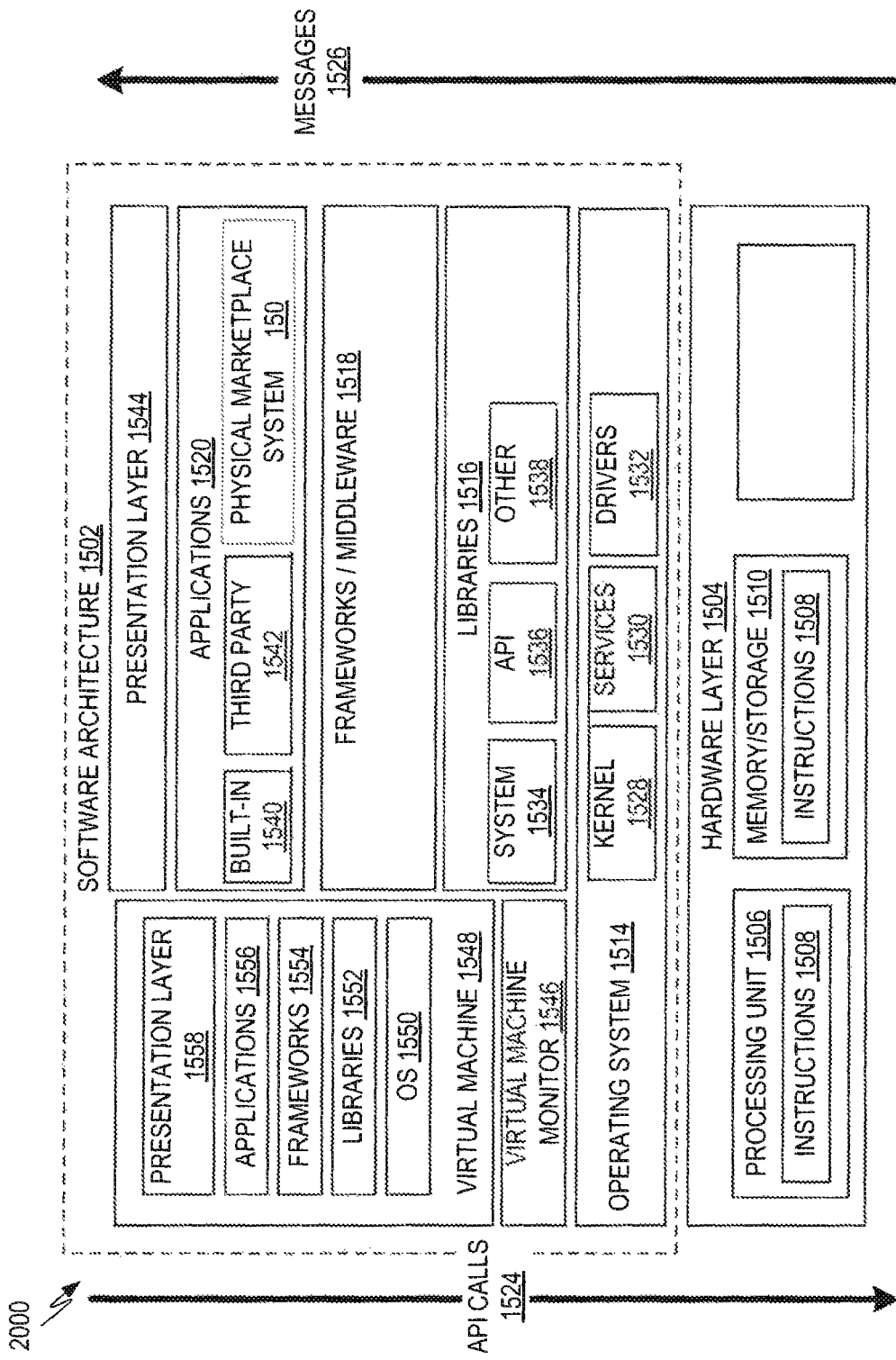
FIG. 15 is a block diagram illustrating an example of a software architecture that may be installed on a machine, according to some example embodiments.

FIG. 15 is a block diagram illustrating an example of a software architecture that may be installed on a machine, according to some example embodiments. FIG. 15 is merely a non-limiting example of a software architecture and it will be appreciated that many other architectures may be implemented to facilitate the functionality described herein. The software architecture 1502 may be executing on hardware such as machine 1600 of FIG. 16 that includes, among other things, processors 1610, memory 1630, and I/O components 1650. A representative hardware layer 1504 is illustrated and can represent, for example, the machine 1600 of FIG. 16. The representative hardware layer 1504 comprises one or more processing units 1506 having associated executable instructions 1508. Executable instructions 1508 represent the executable instructions of the software architecture 1502, including implementation of the methods, modules and so forth of FIGS. 3, 6-12. Hardware layer 1504 also includes memory and/or storage modules 1510, which also have executable instructions 1508. Hardware layer 1504 may also comprise other hardware as indicated by 1512, which represents any other hardware of the hardware layer 1504, such as the other hardware illustrated as part of machine 1600.

In the example architecture of FIG. 15, the software architecture 1502 may be conceptualized as a stack of layers where each layer provides particular functionality. For example, the software architecture 1502 may include layers such as an operating system 1514, libraries 1516, frameworks/middleware 1518, applications 1520 and presentation layer 1544. Operationally, the applications 1520 and/or other components within the layers may invoke API calls 1524 through the software stack and receive a response, returned values, and so forth illustrated as messages 1526 in response to the API calls 1524. The layers illustrated are representative in nature and not all software architectures have all layers. For example, some mobile or special purpose operating systems may not provide a frameworks/middleware layer 1518, while others may provide such a layer. Other software architectures may include additional or different layers.

The operating system 1514 may manage hardware resources and provide common services. The operating system 1514 may include, for example, a kernel 1528, services 1530, and drivers 1532. The kernel 1528 may act as an abstraction layer between the hardware and the other software layers. For example, the kernel 1528 may be responsible for memory management, processor management (e.g., scheduling), component management, networking, security settings, and so on. The services 1530 may provide other common services for the other software layers. The drivers 1532 may be responsible for controlling or interfacing with the underlying hardware. For instance, the drivers 1532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1516 may provide a common infrastructure that may be utilized by the applications 1520 and/or other components and/or layers. The libraries 1516 typically provide functionality that allows other software modules to perform tasks in an easier fashion than to interface directly with the underlying operating system 1514 functionality (e.g., kernel 1528, services 1530, and/or drivers 1532). The libraries 1516 may include system 1534 libraries (e.g., C standard library) that may provide functions such as memory allocation functions, string manipulation functions, mathematic functions, and the like. In addition, the libraries 1516 may include API libraries 1536 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1516 may also include a wide variety of other libraries 1538 to provide many other APIs to the applications 1520 and other software components/modules.

The frameworks 1518 (also sometimes referred to as middleware) may provide a higher-level common infrastructure that may be utilized by the applications 1520 and/or other software components/modules. For example, the frameworks 1518 may provide various graphic user interface (GUI) functions, high-level resource management, high-level location services, and so forth. The frameworks 1518 may provide a broad spectrum of other APIs that may be utilized by the applications 1520 and/or other software components/modules, some of which may be specific to a particular operating system or platform.

The applications 1520 include built-in applications 1540 and/or third party applications 1542. Examples of representative built-in applications 1540 may include, but are not limited to, a contacts application, a browser application, a book reader application, a location application, a media application, a messaging application, and/or a game application. Third party applications 1542 may include any of the built in applications as well as a broad assortment of other applications. In a specific example, the third party application 1542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1542 may invoke the API calls 1524 provided by the mobile operating system such as operating system 1514 to facilitate functionality described herein.

The applications 1520 may utilize built in operating system functions (e.g., kernel 1528, services 1530, and/or drivers 1532), libraries (e.g., system 1534, APIs 1536, and other libraries 1538), and frameworks/middleware 1518 to create user interfaces to interact with users of the system. Alternatively, or additionally, in some systems interactions with a user may occur through a presentation layer, such as presentation layer 1544. In these systems, the application/module "logic" can be separated from the aspects of the application/module that interact with a user.

Some software architectures utilize virtual machines. In the example of FIG. 15, this is illustrated by virtual machine 1548. A virtual machine creates a software environment where applications/modules can execute as if they were executing on a hardware machine (such as the machine of FIG. 16, for example). A virtual machine is hosted by a host operating system (operating system 1514 in FIG. 16) and typically, although not always, has a virtual machine monitor 1546, which manages the operation of the virtual machine as well as the interface with the host operating system (i.e., operating system 1514). A software architecture executes within the virtual machine such as an operating system 1550, libraries 1552, frameworks/middleware 1554, applications 1556 and/or presentation layer 1558. These layers of software architecture executing within the virtual machine 1548 can be the same as corresponding layers previously described or may be different.

In certain embodiments, the physical marketplace system 150 is implemented as an application 1520. For example, the physical marketplace system 150 operates as an application being executed on a server as depicted in FIG. 1. In this example, the intake module 220, the product module 240, and the listing module 260 are implemented as executable code executed by the processing unit 1506.

Figure 16:
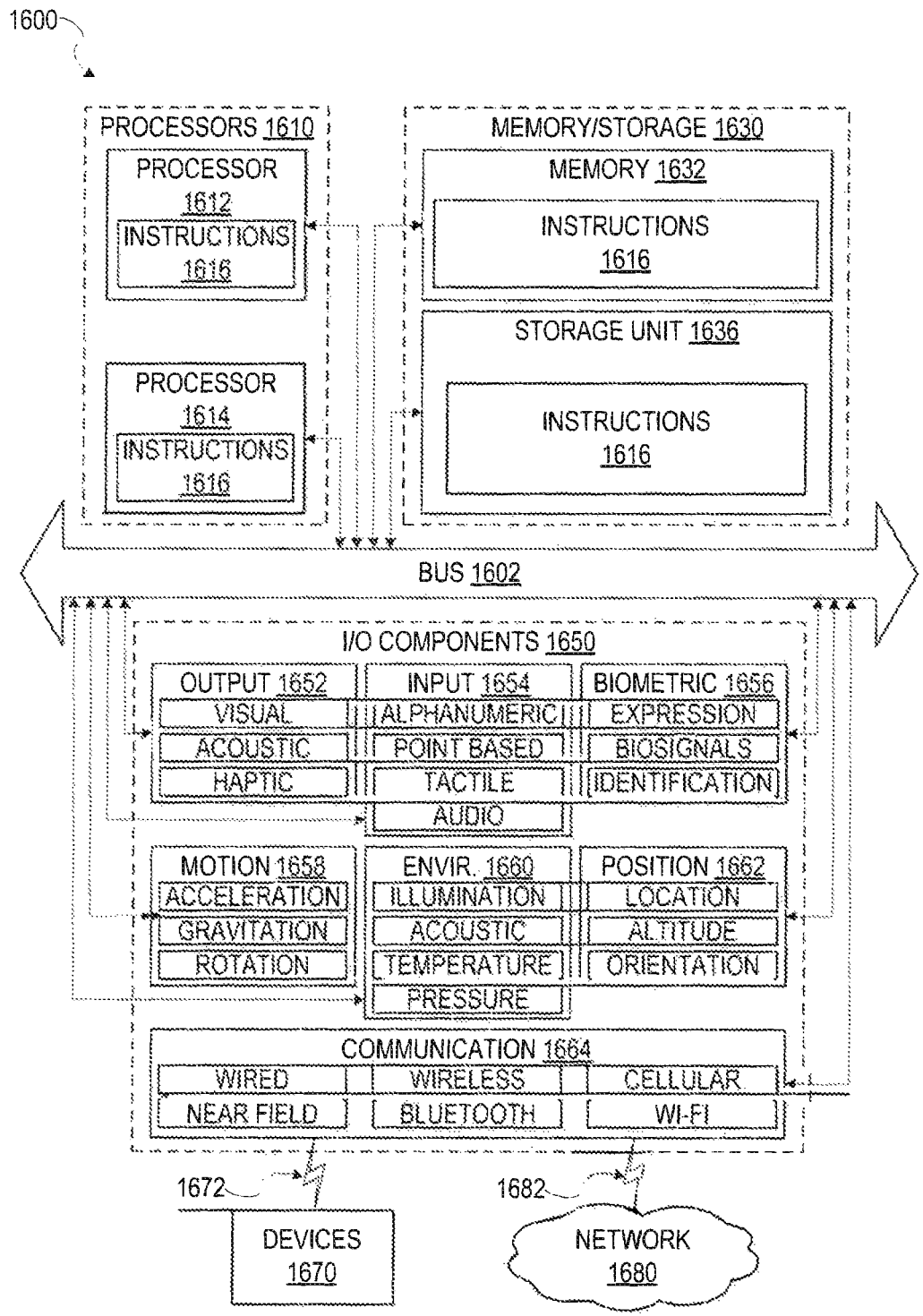
FIG. 16 illustrates a diagrammatic representation of a machine in the form of a computer system within which a set of instructions may be executed for causing the machine to perform any one or more of the methodologies discussed herein, according to an example embodiment.

FIG. 16 illustrates a diagrammatic representation of a machine in the form of a computer system within which a set of instructions may be executed for causing the machine to perform any one or more of the methodologies discussed herein, according to an example embodiment.

In another example embodiment, the physical marketplace system 150 communicates with a framework 1518 and/or one or more libraries 1516. For example, where an interface to the database server 124 is implemented as a library, the listing module 260 stores generated listing in the database 126 using one or more function calls and/or method calls as one skilled in the art may appreciate.

Example Machine Architecture and Machine-Readable Medium

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. For example the instructions may cause the machine to execute the flow diagrams of FIGS. 6-12. Additionally, or alternatively, the instructions may implement the intake module 220, the product module 240, and the listing module 260 of FIG. 3, and so forth. The instructions transform the general, non-programmed machine into a particular machine programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by machine 1600. Further, while only a single machine 1600 is illustrated, the term "machine" shall also be taken to include a collection of machines 1600 that individually or jointly execute the instructions 1616 to perform any one or more of the methodologies discussed herein.

The machine 1600 may include processors 1610, memory 1630, and I/O components 1650, which may be configured to communicate with each other such as via a bus 1602. In an example embodiment, the processors 1610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1612 and processor 1614 that may execute instructions 1616. The term "processor" is intended to include multi-core processor that may comprise two or more independent processors (sometimes referred to as "cores") that may execute instructions contemporaneously. Although FIG. 16 shows multiple processors, the machine 1600 may include a single processor with a single core, a single processor with multiple cores (e.g., a multi-core process), multiple processors with a single core, multiple processors with multiples cores, or any combination thereof.

The memory/storage 1630 may include a memory 1632, such as a main memory, or other memory storage, and a storage unit 1636, both accessible to the processors 1610 such as via the bus 1602. The storage unit 1636 and memory 1632 store the instructions 1616 embodying any one or more of the methodologies or functions described herein. The instructions 1616 may also reside, completely or partially, within the memory 1632, within the storage unit 1636, within at least one of the processors 1610 (e.g., within the processor's cache memory), or any suitable combination thereof, during execution thereof by the machine 1600. Accordingly, the memory 1632, the storage unit 1636, and the memory of processors 1610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof.

The term "machine-readable medium" should be taken to include a single medium or multiple media (e.g., a centralized or distributed database, or associated caches and servers) able to store instructions 1616. The term "machine-readable medium" shall also be taken to include any medium, or combination of multiple media, that is capable of storing instructions (e.g., instructions 1616) for execution by a machine (e.g., machine 1600), such that the instructions, when executed by one or more processors of the machine 1600 (e.g., processors 1610), cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1650 may include a wide variety of components to receive input, provide output, produce output, transmit information, exchange information, capture measurements, and so on. The specific I/O components 1650 that are included in a particular machine will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion and the grouping is in no way limiting. In various example embodiments, the/O components 1650 may include output components 1652 and input components 1654. The output components 1652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environmental components 1660, or position components 1662 among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1658 may include acceleration sensor components (e.g., accelerometer), gravitation sensor components, rotation sensor components (e.g., gyroscope), and so forth.

The environmental components 1660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via coupling 1682 and coupling 1672, respectively. For example, the communication components 1664 may include a network interface component or other suitable device to interface with the network 1680. In further examples, communication components 1664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a Universal Serial Bus (USB)).

Moreover, the communication components 1664 may detect identifiers or include components operable to detect identifiers. For example, the communication components 1664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as a Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1664, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1680 or a portion of the network 1680 may include a wireless or cellular network and the coupling 1682 may be a Code Division Multiple Access (CDMA) connection, a Global System for Mobile communications (GSM) connection, or other type of cellular or wireless coupling. In this example, the coupling 1682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide interoperability for Microwave Access (WiMAX), Long Term Evolution (LTE) standard, others defined by various standard setting organizations, other long range protocols, or other data transfer technology.

The instructions 1616 may be transmitted or received over the network 1680 using a transmission medium via a network interface device (e.g., a network interface component included in the communication components 1664) and utilizing any one of a number of well-known transfer protocols (e.g., Hypertext Transfer Protocol (HTTP)). Similarly, the instructions 1616 may be transmitted or received using a transmission medium via the coupling 1672 (e.g., a peer-to-peer coupling) to devices 1670. The term "transmission medium" shall be taken to include any intangible medium that is capable of storing, encoding, or carrying instructions 1616 for execution by the machine 1600, and includes digital or analog communications signals or other intangible medium to facilitate communication of such software.

In one example embodiment, the intake module 220, the product module 240, and/or the listing module 260 are implemented as part of the instructions 1616. Furthermore, the intake module 220 receives the image from the merchant 340 via one or more communications mediums 1664. Also, the listing module 260 may submit a listing to a network-based via a wired communications medium 1664.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. An apparatus, comprising:
    a processor;
    memory coupled with the processor; and
    instructions stored in the memory and executable by the processor to cause the apparatus to:
        receive a first set of data identifying a product for sale at a physical marketplace that is accessible during a time period by a general public, the first set of data including an image of the product;
        generate an online listing for the product, the online listing including the first set of data;
        determine that an ending time of the time period has elapsed; and
        in response to determining that the ending time of the time period has elapsed, publish the online listing for the product by updating a user interface for accessing a network-based marketplace to display the online listing.

2. The apparatus of claim 1, wherein the instructions are further executable by the processor to cause the apparatus to:
    receive an indication that identifies the physical marketplace; and
    retrieve a schedule associated with the physical marketplace based at least in part on the indication that identifies the physical marketplace, wherein determining that the ending time of the time period has elapsed is based at least in part on the schedule associated with the physical marketplace.

3. The apparatus of claim 1, wherein the instructions are further executable by the processor to cause the apparatus to:
    publish the image of the product in a list of images of products.

4. The apparatus of claim 3, wherein the first set of data indicates a location of the product, and the instructions are further executable by the processor to cause the apparatus to:
    publish a pictorial representation of the physical marketplace that indicates the location of the product at the physical marketplace.

5. The apparatus of claim 4, wherein the instructions are further executable by the processor to cause the apparatus to:
    obtain the location of the product from geolocation metadata associated with the image of the product.

6. The apparatus of claim 1, wherein the instructions are further executable by the processor to cause the apparatus to:
    transmit a prompt requesting a second set of data associated with the product; and
    receive the second set of data associated with the product, wherein generating the online listing is based at least in part on the second set of data.

7. The apparatus of claim 1, wherein the instructions are further executable by the processor to cause the apparatus to:
    analyze the image for an identifying mark; and
    determine product information associated with the product based at least in part on the identifying mark, wherein generating the online listing for the product is based at least in part on the product information.

8. The apparatus of claim 1, wherein the instructions are further executable by the processor to cause the apparatus to:
    receive the first set of data from a merchant device.

9. The apparatus of claim 1, wherein to publish the online listing for the product, the instructions are further executable by the processor to cause the apparatus to:
    access, by a publication system, a database to obtain the online listing for the product, the database storing generated online listings.

10. A computer-implemented method comprising:
    receiving, by one or more processors, a first set of data identifying a product for sale at a physical marketplace that is accessible during a time period by a general public, the first set of data including an image of the product;
    generating, by the one or more processors, an online listing for the product, the online listing including the first set of data;
    determining, by the one or more processors, that an ending time of the time period has elapsed; and in response to determining that the ending time of the time period has elapsed, publishing the online listing for the product by updating a user interface for accessing a network-based marketplace to display the online listing.

11. The computer-implemented method of claim 10, further comprising:
receiving an indication that identifies the physical marketplace; and
retrieving a schedule associated with the physical marketplace based at least in part on the indication that identifies the physical marketplace, wherein determining that an ending time of the time period has elapsed is based at least in part on the schedule associated with the physical marketplace.

12. The computer-implemented method of claim 10, further comprising:
publishing the image of the product in a list of images of products.

13. The computer-implemented method of claim 12, wherein the first set of data indicates a location of the product, the computer-implemented method further comprising:
publishing a pictorial representation of the physical marketplace that indicates the location of the product at the physical marketplace.

14. The computer-implemented method of claim 13, further comprising:
obtaining the location of the product from geolocation metadata associated with the image of the product.

15. The computer-implemented method of claim 10, further comprising:
transmitting a prompt requesting a second set of data associated with the product; and
receiving the second set of data associated with the product, wherein generating the online listing is based at least in part on the second set of data.

16. The computer-implemented method of claim 10, further comprising:
analyzing the image for an identifying mark; and
determining product information associated with the product based at least in part on the identifying mark, wherein generating the online listing for the product is based at least in part on the product information.

17. The computer-implemented method of claim 10, further comprising:
receiving the first set of data from a merchant device.

18. A non-transitory computer-readable medium storing code comprising instructions that, when executed by a processor, cause an apparatus to perform operations comprising:
receiving a first set of data identifying a product for sale at a physical marketplace that is accessible during a time period by a general public, the first set of data including an image of the product;
generating an online listing for the product, the online listing including the first set of data;
determining that an ending time of the time period has elapsed; and
in response to determining that the ending time of the time period has elapsed, publishing the online listing for the product by updating a user interface for accessing a network-based marketplace to display the online listing.

19. The non-transitory computer-readable medium of claim 18, wherein the instructions, when executed by the processor, cause the apparatus to perform operations comprising:
receiving an indication that identifies the physical marketplace; and
retrieving a schedule associated with the physical marketplace based at least in part on the indication that identifies the physical marketplace, wherein determining that the ending time of the time period has elapsed is based at least in part on the schedule associated with the physical marketplace.

20. The non-transitory computer-readable medium of claim 18, wherein the instructions, when executed by the processor, cause the apparatus to perform operations comprising:
transmitting a prompt requesting a second set of data associated with the product; and
receiving the second set of data associated with the product, wherein generating the online listing is based at least in part on the second set of data.

* * * * *